United States Patent Office 3,387,445
Patented June 11, 1968

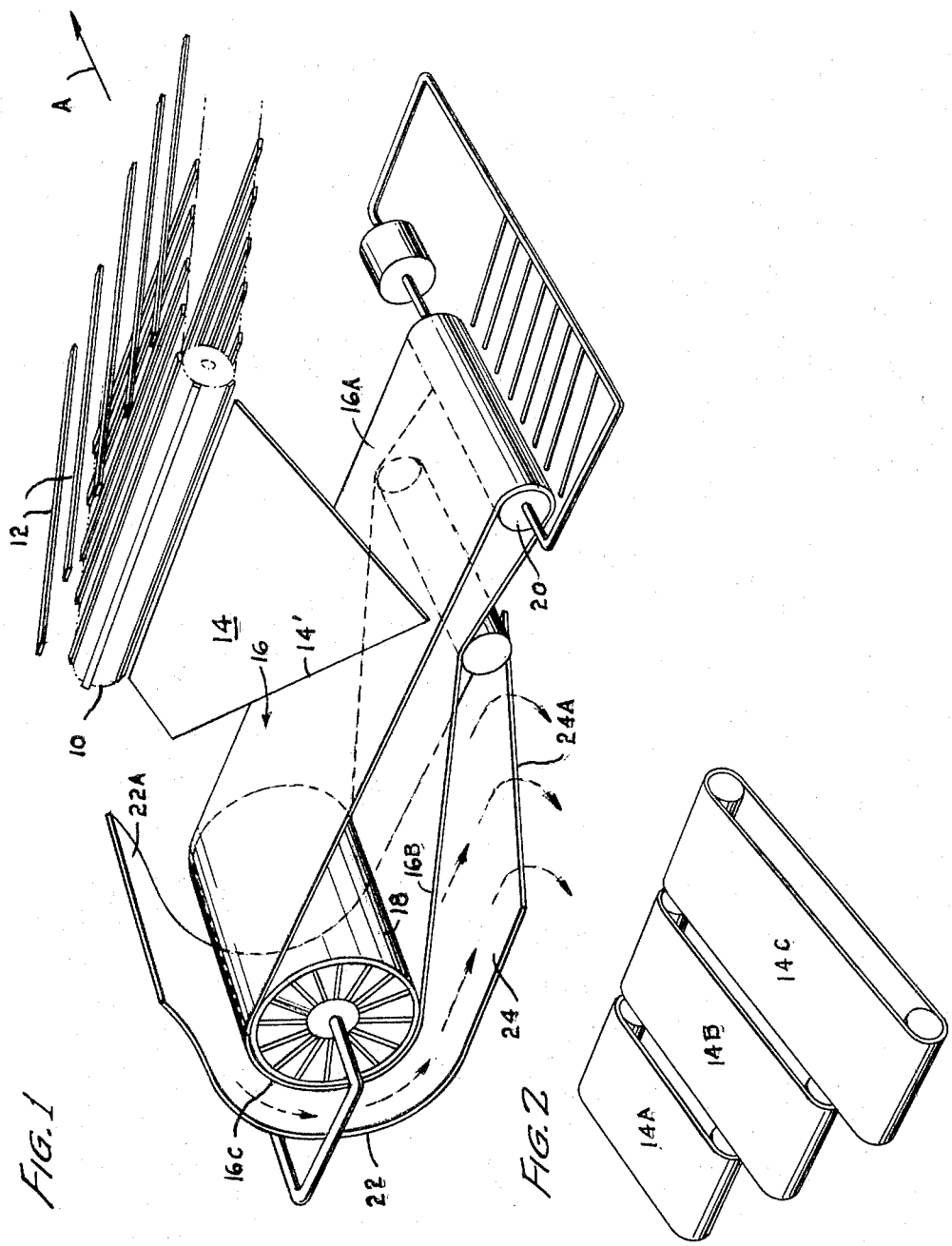

3,387,445
GREEN PEANUT VINE TURNING MACHINE
Eli W. Reinhardt and Henry E. Morris, both of
P.O. Box 72, Ashburn, Ga. 31714
Continuation-in-part of application Ser. No. 439,736,
Mar. 15, 1965. This application Sept. 20, 1965, Ser.
No. 488,316
8 Claims. (Cl. 56—370)

ABSTRACT OF THE DISCLOSURE

Vines with the roots attached are discharged in a continuous swath in upright position onto an inverting conveyer which rotates them through substantially 180 degrees about an axis extending generally in the direction of discharge for delivery of the vines onto the ground in an inverted roots-up position.

Cross-reference to related application

This application is a continuation-in-part of our prior pending application, Ser. No. 439,736, now abandoned filed Mar. 15, 1965.

Background of the invention

In harvesting peanuts, it is customary to utilize a machine which moves along the rows of peanuts, digging them and, in most instances, shaking and sifting them to remove stones and/or earth which adhere to the roots, then discharging them back onto the ground in upright position as a generally continuous intermatted swath of vines extending rearwardly from the machine. Normally, the vines are left in windrows as thus deposited for sufficient time to permit drying, following which they are picked up by suitable harvesting and/or combining apparatus for treatment in usual manner to remove the peanuts.

However, where the vines are thus deposited in roots-down position on the ground, the roots and attached peanuts are covered and shaded by the vines in an unfavorable position for drying and such that they are subjected to adverse effects by rain. Thus, in the event of rain, while the vines are so positioned, many of the peanuts will be lost through becoming buried in the resulting mud; and, in addition, the stems by which the peanuts are attached to the roots will frequently deteriorate and become weakened with resulting detachment and loss of peanuts at the time an attempt is made to pick up the vines by conventional pick-up machinery.

Summary of the invention

With these considerations in mind, we have conceived of improving such a peanut digging and windrowing machine to include a mechanism for inverting the vines before redepositing them on the ground in a continuous windrow of inverted vines extending rearwardly generally along the path traversed by the machine. With such inverted disposition of the vines, the peanuts thereon are directed upwardly in optimum position for drying by action of the sun and air and are spaced above the ground by the foilage of the vines themselves.

In particular, the instant invention contemplates an inverting mechanism comprising a conveyer arranged to receive the vines from the digging machine and to rotate them through substantially 180 degrees about an axis generally parallel to the direction of movement of the vines as they are discharged from the digging machine. Such an inverting conveyer includes an angularly moving transition conveyer section disposed to receive the discharge vines on its upper portion, together with a guide spaced from this section and extending concentrically therearound for at least the lower quandrant of the angular movement thereof to maintain the vines in operative engagement with the inverting conveyer as they move around and beneath this curved transition portion thereof incident to their inversion. Preferably, the inverting conveyer discharges the inverted vines onto the ground from a location just above the ground level.

Brief description of drawing

The preferred embodiment of the invention, together with a minor modification thereof, is illustrated in the accompanying drawings in which:

FIGURE 1 is a perspective diagrammatic view of a preferred embodiment of the invention as applied to the discharge end of a ground traversing peanut digging and shaking machine, of which only the discharge end portion is illustrated; and FIGURE 2 is a perspective view of an alternative form of transfer conveyer for delivering the vines from the digging machine onto the inverting mechanism.

Description of the preferred embodiment

Referring now in detail to the accompanying drawings, the numeral 10 designates generally the elevating conveyer of a usual peanut digging machine which may be of the type generally exemplified in the U.S. Patent to Long 2,999,547, granted Sept. 12, 1961. The digging machine is of the well-known type in which the machine, on being towed or propelled forwardly in the direction of the arrow A (in FIGURE 1) along rows of peanuts, uproots the peanut vines with attached peanuts, picks up the uprooted vines, and delivers them in a continuous row or rows of intermatted vines onto the elevating conveyer 10 for movement and discharge rearwardly with respect to the movement of the machine. The vines may be pressed downwardly against the conveyer by the conventional hold-down bars shown fragmentarily at 12.

Upon their discharge from the conveyer 10, the vines are delivered onto the inclined transfer conveyer 14, here shown in the form of a smooth downwardly and rearwardly extending chute which, in turn, deposits them on the inverting conveyer 16 of the preferred embodiment. In the embodiment here illustratetd, the conveyer 16 is of the endless type, including generally horizontally disposed upper and lower runs 16A and 16B, moving transversely to the movement of the conveyer 10, the conveyer 16 in its entirety being guided for movement in an endless circuit by the rotatably supported drums 18 and 20 respectively.

In order that the transfer conveyer 14 may distribute the vines substantially across the entire width of the upper run of the conveyer 16, the discharge edge 14′ at the lower end of the transfer conveyer chute extends diagonally across substantially the full width of the upper conveyer run 16A. It will be understood that the conveyer 16 is driven by any suitable means such as a pulley 17 on the shaft of the drum 20 for connection by a drive belt to a suitable drive pulley on the power source in a direction such that its upper run moves toward and downwardly around the roll 18, as indicated by the arrow B in FIGURE 1, the curved or arcuately moving transition portion 16C of the conveyer in the present instance thus carrying the vines through a curve of 180 degrees or thereabouts around an axis defined by the roll shaft 21 extending generally parallel to the movement of the machine. Upon completion of this 180 degrees of movement, the vines are completely inverted.

In order to confine the vines in operative engagement with the conveyer transition portion 16C, there is provided a curved guide, here shown in the form of a rigid plate 22, which is radially spaced from the roll 18 and the transition portion 16C of the conveyer to define there-between a curved path of movement for the vines. While the plate or guide 22 is required to encircle the roll and the transition belt section 16C only coextensively with approximately the lower quadrant of the transition portion 16C, it is desirable in the present form that it also extend for substantially a full 180 degrees or more with its upper end terminating in an upwardly flared portion 22A. This flared portion 22A cooperates with the roll 18 and conveyer 16 to define an inwardly converging mouth for receiving and guiding the vines.

It will be noted that, in the preferred embodiment, the lower end portion of the guide 22 is extended generally tangentially to the curved portion thereof in a horizontal direction to define a discharge chute 24. Preferably, this chute 24 is located just above ground level and its discharge end is defined by a diagonally extending discharge edge 24A, the purpose of which is to redistribute the discharged and inverted swath of vines over a substantial width on the ground.

The vines discharged rearwardly from the peanut digging machine, while flowing in a continuous unbroken stream or swath, are nevertheless turned at right angles as they are received on the upper run of the inverter-conveyer and are distributed over the width of the conveyer by the diagonally inclined discharge edge 14' of the transfer chute 14. Then, after being inverted by movement around the drum or roll 18, in engagement with the curved transition portion 16C of the conveyer belt, they emerge in a generally horizontal transverse direction on the discharge chute 24 and are again turned through substantially 90 degrees incident to their passage over the diagonal discharge edge 24A of the chute 24 and onto the ground. Inasmuch as the successive right angular turns of the vines, in passing from the discharge chutes 14 and 24 respectively, are in opposite directions and through equal angles, the vines will be substantially undistorted by their movement through the machine, thereby facilitating the ability of the machine to carry out its functions and to ultimately deposit the vines on the ground in an efficiently formed and continuous windrow.

It has been found desirable to cause the lower run 16B of the inverting conveyer to move gradually away or diverge upwardly from the discharge chute 24 in the direction of movement of the conveyer run 16B, for the purpose of providing an outwardly flaring discharge mouth to facilitate the free discharge and rearward movement of the vines without interference or hindrance by the transversely moving lower conveyer run 16B. To this end, the lower run of the conveyer is deflected upwardly away from the horizontal discharge chute 24 by means such as the roller 26. Stripper fingers 27 carried by the machine frame F prevent movement of vines around the drum 20.

In FIGURE 2, there is shown one of several possible alternative forms which the transfer conveyer or chute 14, for instance, might assume. In this form, the transfer conveyer is defined by multiple and generally parallel endless conveyers 14A, 14B, 14C, the discharge edges of which are aligned diagonally to the direction of discharge of the vines and to the movement of the machine to thus distribute the vines over the entire surface or width of the inverting conveyer 16 as in the preferred embodiment.

In this application, we have shown and described only the preferred embodiment, together with a minor modification, of our invention. However, we recognize that our invention is capable of other and different embodiments and that its several details may be modified in various ways without departing from our invention as defined in the accompanying claims.

Having thus described our invention, we claim:

1. In a peanut digging machine of the type which moves along rows of peanuts, digging the vines and conveying them rearwardly for discharge in a continuous swath of intermatted vines in upright position, the improvement comprising, in combination with said machine, a vine inverting and windrowing mechanism connected to said machine for movement therewith, said mechanism comprising a conveyer having a transition section disposed for downward angular movement about an axis generally parallel to the movement of the machine, an arcuate guide spaced from and concentric to the transition section around substantially a lower quadrant thereof and with said section defining an arcuate path of movement for the vines terminating in a horizontally and rearwardly directed discharge mouth, and means for guiding the said continuous swath of vines in upright position from said digging machine onto said transition section for movement between said transition section and said guide and for discharge onto the ground in inverted position through said mouth.

2. In a peanut digging machine of the class which moves along rows of peanuts delivering the peanut vines with roots attached onto an elevating conveyer for discharge from the conveyer in upright position, the improvement which includes, in combination with said machine, a vine inverting and windrowing mechanism comprising a generally horizontal conveyer section moving in a direction transversely to the movement of said elevating conveyer and disposed for reception of the vines discharged from the elevating conveyer, a transition conveyer section curved downwardly through an angle of 180 degrees from one end of the horizontal conveyer section, said horizontal conveyer section being positioned tangentially to the transition section, said sections jointly defining a continuous path of movement for the vines toward and around said transition section, and a guide curved concentrically to said transition section, but spaced radially therefrom, to maintain the vines in operative engagement with the transition section during their movement around the transition section, said guide terminating below said horizontal run to deposit the vines in a continuous inverted windrow extending rearwardly from the machine.

3. A machine as defined in claim 2, including a transfer conveyer interposed between said elevating conveyer and said mechanism for receiving the vines discharged rearwardly from the harvesting machine and distributing them substantially across the width of said horizontal conveyer section.

4. A machine as defined in claim 3, in which said transfer conveyer comprises a chute sloping downwardly from the discharge end of the elevating conveyer with its lower discharge end over said horizontal conveyer section, and including a discharge edge extending diagonally over said horizontal conveyer section for substantially the full width of the latter.

5. A machine as defined in claim 2, including a generally horizontal discharge chute extending tangentially from said curved guide.

6. A machine as defined in claim 5, in which said discharge chute comprises a unitary extension of the said curved guide.

7. A machine as defined in claim 5, in which said discharge chute is provided with a discharge edge extending substantially across the width of said inverted windrow diagonally to the direction of ground traversing movement of the machine.

8. A machine as defined in claim 7, in which said transfer conveyer comprises a chute having a discharge edge disposed diagonally over and across said horizontal conveyer section and substantially at a right angle to the discharge edge of the discharge chute.

References Cited

UNITED STATES PATENTS

| 2,391,427 | 12/1945 | Kucera | 56—370 |
| 2,679,720 | 6/1954 | Cymara | 56—370 |
| 3,260,314 | 7/1966 | Edwards | 171—101 |

ROBERT E. BAGWILL, *Primary Examiner.*